United States Patent
Jupe et al.

(10) Patent No.: US 7,162,022 B2
(45) Date of Patent: Jan. 9, 2007

(54) METHOD FOR SIGNALING AN INCOMING CALL RECEIVED AT A TELECOMMUNICATIONS TERMINAL, A TELECOMMUNICATIONS TERMINAL AND A NETWORK UNIT

(75) Inventors: Michael Jupe, Ludwigsburg (DE); Klaus-Peter Schmoll, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/494,455

(22) PCT Filed: Aug. 22, 2002

(86) PCT No.: PCT/DE02/03076

§ 371 (c)(1),
(2), (4) Date: Oct. 26, 2004

(87) PCT Pub. No.: WO03/041376

PCT Pub. Date: May 15, 2003

(65) Prior Publication Data

US 2005/0063523 A1    Mar. 24, 2005

(30) Foreign Application Priority Data

Oct. 30, 2001  (DE) ................................ 101 53 526

(51) Int. Cl.
*H04M 1/66*    (2006.01)

(52) U.S. Cl. ..................... 379/210.02; 379/142.06; 379/207.13; 379/211.02

(58) Field of Classification Search ........... 379/142.06, 379/210.02, 207.13, 211.02
See application file for complete search history.

(56) References Cited

U.S. PATENT DOCUMENTS

| | | | | |
|---|---|---|---|---|
| 5,276,731 A * | 1/1994 | Arbel et al. | ........... | 379/211.02 |
| 5,329,578 A * | 7/1994 | Brennan et al. | ....... | 379/211.03 |
| 5,467,388 A * | 11/1995 | Redd et al. | ............ | 379/210.02 |
| 5,604,791 A * | 2/1997 | Lee | ......................... | 379/88.21 |
| 5,930,700 A | 7/1999 | Soper et al. | | |
| 6,005,870 A * | 12/1999 | Leung et al. | ............... | 370/466 |
| 6,031,899 A * | 2/2000 | Wu | ....................... | 379/142.01 |
| 6,289,084 B1 | 9/2001 | Bushnell | | |
| 6,359,970 B1 * | 3/2002 | Burgess | ..................... | 379/67.1 |
| 6,456,706 B1 * | 9/2002 | Blood et al. | ................ | 379/188 |
| 6,650,746 B1 * | 11/2003 | Groen et al. | .......... | 379/207.16 |
| 2004/0233892 A1 * | 11/2004 | Roberts et al. | ............. | 370/352 |

FOREIGN PATENT DOCUMENTS

| | | |
|---|---|---|
| DE | 4 447 241 | 7/1996 |
| EP | 0 726 669 | 8/1996 |
| EP | 0 837 611 | 4/1998 |

* cited by examiner

*Primary Examiner*—Fan Tsang
*Assistant Examiner*—Simon Sing
(74) *Attorney, Agent, or Firm*—Kenyon & Kenyon LLP

(57) ABSTRACT

A method for signaling an incoming call received at a telecommunications terminal, a telecommunications terminal and a network unit that signals an incoming call at the telecommunications terminal depending on the urgency of the incoming call. The incoming call is signaled at the telecommunications terminal only when an urgency value transmitted together with the incoming call exceeds a threshold value.

21 Claims, 3 Drawing Sheets

METHOD FOR SIGNALING AN INCOMING CALL RECEIVED AT A TELECOMMUNICATIONS TERMINAL, A TELECOMMUNICATIONS TERMINAL AND A NETWORK UNIT

FIELD OF THE INVENTION

The present invention is directed to a method for signaling an incoming call received at a telecommunications terminal, a telecommunications terminal and a network unit.

BACKGROUND INFORMATION

There are methods for signaling an incoming call received at a telecommunications terminal, and also telecommunications terminals having a signaling device to signal incoming calls, and also network units of a telecommunications network having a device for forwarding an incoming call to a dialed telecommunications terminal.

BRIEF SUMMARY OF THE INVENTION

With the exemplary method according to the present invention for signaling an incoming call received at a telecommunications terminal, the telecommunications terminal according to the present invention and the network unit according to the present invention, the signal for the incoming call is initiated at the telecommunications terminal only when an urgency value that is transmitted together with the incoming call exceeds a preset threshold value. This ensures that an incoming call is signaled as a function of the urgency of the incoming call. The telecommunications terminal user is hence in a position to remain undisturbed by less important calls in particular in situations where the signal would be disruptive.

It may be of particular advantage if the preset threshold value is entered at an input unit of the telecommunications terminal. This enables the user of the telecommunications terminal to set his own threshold value and adjust the value to the level of interference acceptable in any given situation.

The urgency value may also be entered at a caller's end. This enables the caller to determine the urgency of reaching the user of the telecommunications terminal.

A particularly easy option for entering and transmitting such an urgency value may be to append the urgency value to a dialed number.

The urgency value may be compared with the threshold value in a network unit of a telecommunications network and the incoming call received at the telecommunications terminal is forwarded from the network unit to the telecommunications terminal only when the urgency value exceeds the threshold value. This means that no additional outlay is required for implementing the urgency-based signal suppression in the telecommunications terminal itself and hence no additional production cost for the telecommunications terminal is incurred.

In contrast, when the urgency value is compared with the threshold value in the telecommunications terminal and a signal for the incoming call is initiated at the telecommunications terminal only when the urgency value exceeds the threshold value, the urgency based signal may be disabled largely independently from the telecommunications network, or from the network units of the telecommunications network.

A notification regarding the threshold value may be transmitted to the caller only when the urgency value is lower than or equal to the threshold value. The caller is hereby informed how he may reach the user of the telecommunications terminal by phone by dialing the specific urgency value. This allows the caller to decide whether or not to disturb the telecommunications terminal user with his call. He may make this decision depending on the importance of his call.

A notification regarding the threshold value may be transmitted to the caller when the caller dials the number to the telecommunications terminal. This informs the caller of the threshold value before he sets an urgency value and hence reduces the risk of disturbing the telecommunications terminal user.

The incoming call may be saved in a call list in the event that the urgency value is lower than or equal to the threshold value. The telecommunications terminal user is hereby informed of the incoming call even when its signal is suppressed at the telecommunications terminal due to the set threshold value.

The same advantage may also be achievable when the incoming call is forwarded to a voicemail recorder in the event that the urgency value is lower than or equal to the threshold value. This function has the additional advantage that the caller is able to leave a message for the telecommunications terminal user which may eliminate the need for a return call by the telecommunications terminal user.

The signal for the incoming call may be initiated at the telecommunications terminal only when the phone number of the caller matches a preset phone number. This function ensures that the telecommunications terminal user receives incoming calls only from select callers. Incoming calls from undesired callers are thus suppressed.

The telecommunications terminal may be provided with an input unit which may be used to preset the threshold value and/or the urgency value. This enables the telecommunications terminal user to adjust the setting of the threshold value in correlation to the desired protection from disruption caused by the signal of an incoming call at the telecommunications terminal. The caller may set the urgency value of his incoming call depending on the importance of his call.

The network unit may include an extractor which extracts a phone number of the telecommunications terminal and the urgency value from a digital sequence received from the caller. This enables the urgency value simply to be appended by the caller when he dials the phone number to the telecommunications terminal.

DETAILED DESCRIPTION

Figure 1:
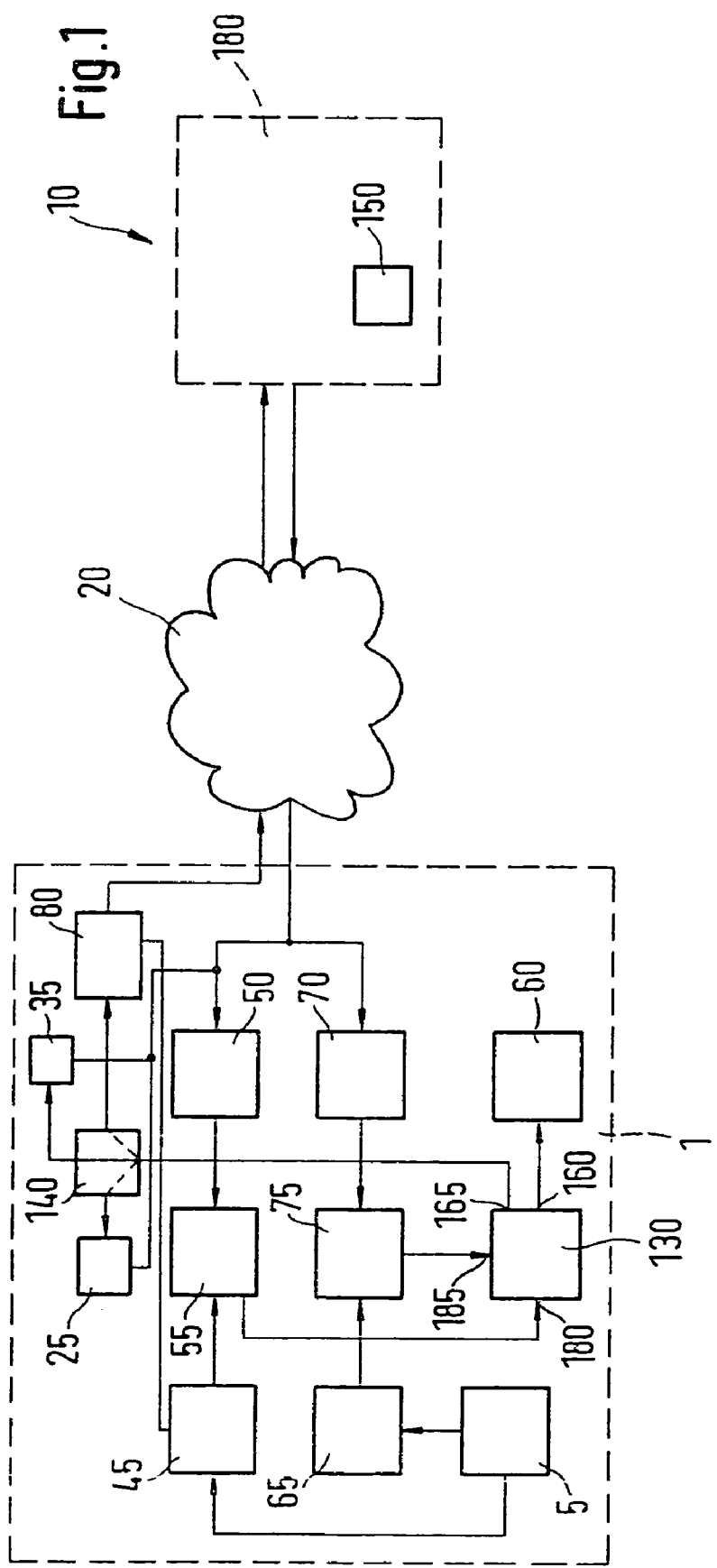
FIG. 1 shows a block diagram of a first exemplary embodiment of the present invention.

Reference number 1 in FIG. 1 identifies a telecommunications terminal. This may be a cell phone, a cordless phone or a wired phone, for example.

Telecommunications terminal 1 includes a first input unit 5 which may be designed, for example, as an alphanumeric ten-digit keypad. A first memory device 45 and a first phone number memory 65 are connected to input unit 5. A first comparator 55, which in turn is connected to a first detector 50, is connected to first memory device 45. A second comparator 75, which in turn is connected to a second detector 70, is connected to first phone number memory 65. First detector 50 and second detector 70 are connected to a telecommunications network 20 either by wire or via an air interface and receive signals from telecommunications network 20. First comparator 55 and second comparator 75 are connected to a first AND gate 130. A first output 160 of first AND gate 130 is connected to a signaling device 60. A second output 165 of first AND gate 130 is connected via a switch 140 optionally to a first call list 25, to a first voicemail recorder 35 or to a first transmitter 80. First switch 140 may be designed such that it connects only one of these three components 25, 35, 80 to second output 165 of first AND gate 130. In addition, it may be designed such that first switch 140 connects two of these components 25, 35, 80 or all three components 25, 35, 80 simultaneously to first output 160 of first AND gate 130. In this instance, transmitter 80 is also wire-connected to telecommunications network 20 or connected via an air interface. Reference number 10 in FIG. 1 refers to a caller from a second telecommunications terminal 180. In this case, second telecommunications terminal 180 may be configured as a cell phone, a cordless telephone or a wired telephone, and includes a second input unit 150. Second input unit 150 may also be designed as an alphanumeric ten-digit keypad.

The drawing in FIG. 1 contains only those elements that are necessary to understand the invention.

First telecommunications terminal 1 includes, as options, second detector 70, second comparator 75 and first phone number memory 65. When caller 10 initiates a call from second telecommunications terminal 180 by dialing the number to first telecommunications terminal 1 at second input unit 150, he may use the same input unit 150 to set an urgency value which will be transmitted to telecommunications network 20 along with the initiated call. For example, the urgency value may be dialed as a digit appended to the dialed phone number and may thus be any whole number from zero to nine. Alternatively, the value range may also be extended upward beyond the one-digit number range in which case more than one digit will have to be entered at second input unit 150 after the phone number to represent the urgency value. Telecommunications network 20 transmits the urgency value simultaneously with the call placed to first telecommunications terminal 1. First detector 50 identifies the urgency value from the incoming call. A preset threshold value is stored in first memory device 45 with such value either being set at first input unit 5 by the user of first telecommunications terminal 1 or being set as a fixed default value, for example. First comparator 55 now checks whether the urgency value received exceeds the preset threshold value. If this is the case, a first input 180 (note: reference number 180 is used in FIG. 1 to denote the second telecommunications terminal and the first input of the first AND gate) of first AND gate 130 is set. A default value for a second input 185 of first AND gate 130 may also be preset. In this case, first output 160 of first AND gate 130 is also set, thereby instructing signaling device 60 to initiate the acoustic and/or visual signal for the incoming call in telecommunications terminal 1. In this drawing, second output 165 of first AND gate 130 is not set and consequently neither first call list 25, nor first voicemail recorder 35, nor first transmitter 80 is activated.

If first comparator 55 determines that the urgency value is lower than or equal to the preset threshold value, first input 180 of first AND gate 130 is reset. As a result, first output 160 of first AND gate 130 is also reset, which instructs signaling device 60 not to initiate the signal for the incoming call, so that the user of first telecommunications terminal 1 is not disturbed by the incoming call. At the same time, second output 165 of first AND gate 130 is set. This activates via first switch 140 first call list 25 and/or first voicemail recorder 35 and/or first transmitter 80. First voicemail recorder 35 and first call list 25 are also connected to telecommunications network 20. When first call list 25 is activated by setting second output 165 of first AND gate 130, the list saves the number of second telecommunications terminal 180 if such number was transmitted to first telecommunications terminal 1 with the incoming call, thereby enabling the number to be called back at a later time. When first voicemail recorder 35 is activated by setting second output 165 of first AND gate 130, first voicemail recorder 35 receives the incoming call and allows caller 10 to record a message that may be retrieved by the user of telecommunications terminal 1 at a later time. If first transmitter 80 is activated by setting second output 165 of first AND gate 130, first transmitter 80 transmits the preset threshold value, stored in first memory device 45, to second telecommunications terminal 180 via telecommunications network 20. For this reason, first transmitter 80 is connected to first memory device 45. This enables caller 10 to view the preset threshold value on second telecommunications terminal 180, for example on a display not shown in FIG. 1. Caller 10 is thereby informed of the urgency value he must set in order to signal his call to first telecommunications terminal 1.

If second detector 70, second comparator 75 and first phone number memory 65 are also present, the following additional function may be executed. If the phone number of second telecommunications terminal 180 is transmitted together with the incoming call from caller 10 to first telecommunications terminal 1 via telecommunications network 20, second detector 70 is able to identify this phone number. By using input unit 5, the user of first telecommunications terminal 1 is able to save at least one phone number for a caller in first phone number memory 65. Second comparator 75 compares the phone number of caller 10 identified by second detector 70 with the phone numbers saved in first phone number memory 65. When the comparator determines a match, i.e., the phone number of caller 10 identified by second detector 70 is stored in first phone number memory 65, second input 185 of the first AND gate is set. Signaling device 60 will then activate a signal for the incoming call in those instances when the detected urgency value exceeds the preset threshold value and when the identified phone number of caller 10 is found to be stored in first phone number memory 65. If one of these two conditions is not met, first voicemail recorder 35 and/or first call list 25 and/or first transmitter 80 is activated in the manner described and signaling device 60 is deactivated, thereby suppressing the signal for the incoming call at first telecommunications terminal 1. At the same time, second input 185 of first AND gate 130 is reset when the phone number of caller 10 identified by second detector 70 is not stored in first phone number memory 65. In this fashion, the phone numbers stored in first phone number memory 65 generate a positive VIP list. Alternatively, a negative VIP list may be generated in first phone number memory 65, saving in this memory only one or multiple phone numbers of callers by using input unit 5 for suppressing the signal for incoming calls from these numbers. In the latter case, second input 185 of first AND gate 130 is set by second comparator 75 when the phone number identified by second detector 70 is not stored in first phone number memory 65. In the inverse case, second comparator 75 resets second input 185 of first AND gate 130 when the phone number of caller 10 identified by second detector 70 is not stored in first phone number memory 65.

If caller 10 does not enter an urgency value when dialing first telecommunications terminal 1, first detector 50 will not be able to identify an urgency value and first comparator 55 resets first input 180 of first AND gate 130, thereby suppressing the signal to first telecommunications terminal 1. If first transmitter 80 is actuated via first switch 140 by second output 165 of first AND gate 130, which is then set, the preset threshold value is transmitted in the described manner to caller 10 via telecommunications network 20. This enables caller 10 to retrieve the preset threshold value of first telecommunications terminal 1 by calling first telecommunications terminal 1 without the concern of possibly activating the signal to first telecommunications terminal 1 with his call, thereby disturbing the user of first telecommunications terminal 1.

If the user of first telecommunications terminal 1 wishes to send a call to telecommunications network 20, it may be programmed such that the user himself must set an urgency value by entering the value at input unit 5, with such urgency value then being transmitted to telecommunications network 20 together with the initiated outgoing call in a manner not addressed in FIG. 1.

Figure 2:
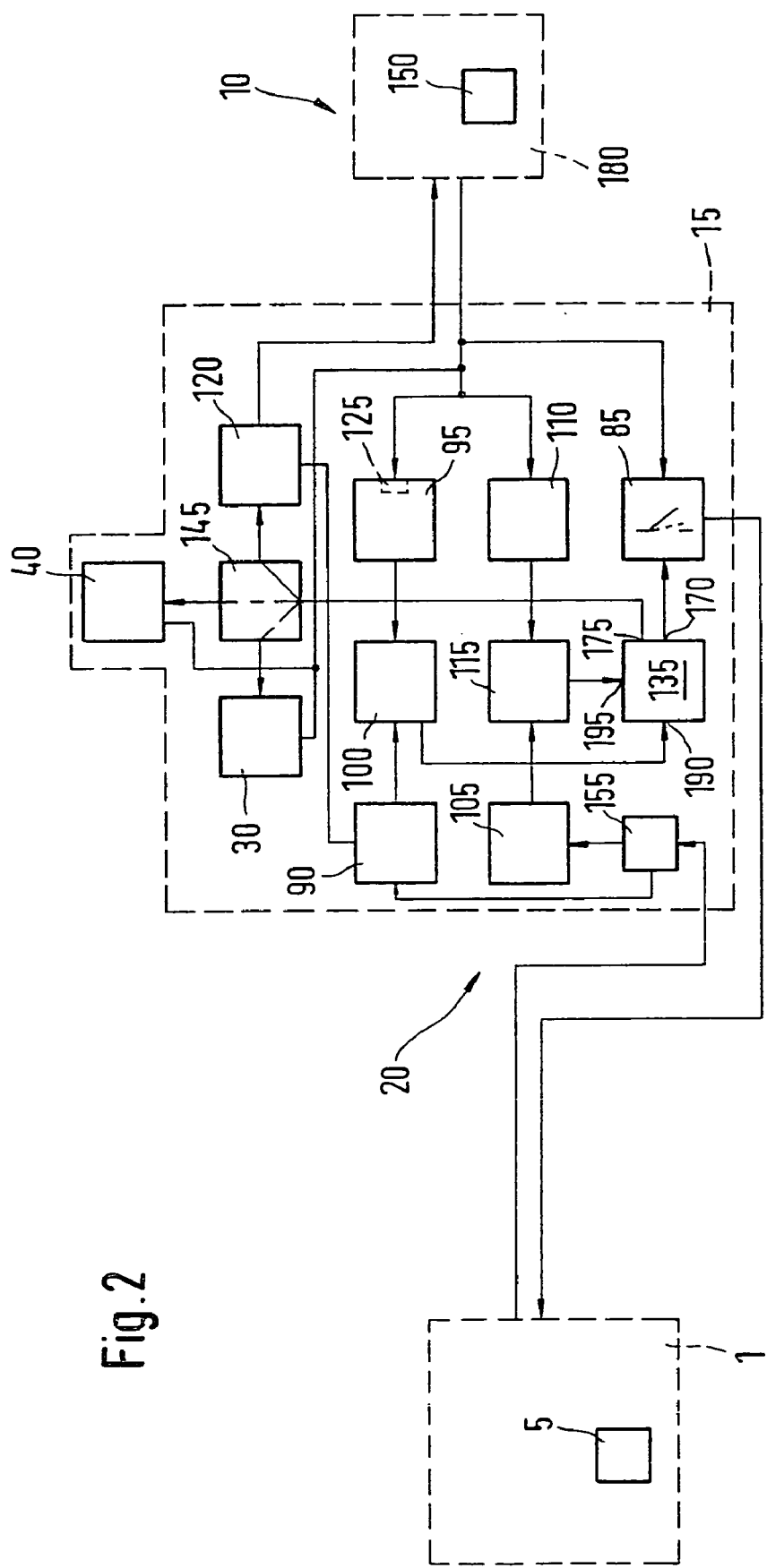
FIG. 2 shows a block diagram of a second exemplary embodiment of the present invention.

The second embodiment of the invention is shown in FIG. 2 in which the same reference numbers are used for the same elements as in FIG. 1. In this example, first telecommunications terminal 1 includes first input unit 5. Second telecommunications terminal 180 of caller 10 includes second input unit 150. First telecommunications terminal 1 and second telecommunications terminal 180 are interconnected via telecommunications network 20 with the connection being established via a network unit 15 of telecommunications network 20. Telecommunications network 20 may be a cell phone network or a fixed telephone network. This example also includes the variable that first telecommunications terminal 1 is a cell phone and telecommunications network 20 is a cell phone network whereas second telecommunications terminal 180 may be a wired telephone which is connected to telecommunications network 20 via a fixed telephone network not illustrated in FIG. 2. The reverse scenario may be done wherein first telecommunications terminal 1 is a wired telecommunications terminal, telecommunications network 20 is a fixed telephone network and second telecommunications terminal 180 is a cell phone that is connected to telecommunications network 20 via a cell phone network which is not illustrated in FIG. 2. Alternatively, both devices, first telecommunications terminal 1 and second telecommunications terminal 180, may each be configured as cell phones, and telecommunications network 20 may be configured as a cell phone network. Alternatively, first telecommunications terminal 1 and second telecommunications terminal 180 may both be configured as wired telephones and the telecommunications network 20 as a fixed telephone network.

Network unit 15 includes a third detector 95 to receive an incoming call from caller 10. Third detector 95 includes an extractor 125 to extract an urgency value transmitted together with the incoming call. A third comparator 100 is connected to third detector 95. Third comparator 100 in turn is connected to a second memory device 90. In addition, third comparator 100 is connected to a first input 190 of a second AND gate 135. A second input 195 of second AND gate 135 may be set permanently or may be connected optionally, as illustrated in FIG. 2, to a fourth comparator 115. When fourth comparator 115, as illustrated in FIG. 2, is included in network unit 15, it is connected both to a fourth detector 110 and to a second phone number memory 105. Fourth detector 110 also identifies the incoming call from caller 10. A first output 170 of second AND gate 135 is connected to a device 85 for forwarding the incoming call of caller 10. Forwarding device 85 executes the function of forwarding the incoming call of caller 10 to the telecommunications terminal dialed by caller 10, which according to the example illustrated in FIG. 2 is first telecommunications terminal 1. A second output 175 of second AND gate 135 is connectable via a second switch 145 to a second call list 30 and/or a second voicemail recorder 40 and/or a second transmitter 120. Second transmitter 120 is connected to second memory device 90. Second call list 30 and second voicemail recorder 40 are connected to the receiving branch of the incoming call. Second transmitter 120 is designed to send information to a caller, in this case to caller 10. Network unit 15 also includes a selector 155 which enables the caller, in this particular case represented by first telecommunications terminal 1 in the example illustrated in FIG. 2, to enter a preset threshold value in second memory device 90 or to enter one or more phone numbers in second phone number memory 105, depending on whether first telecommunications terminal 1 is addressing second memory device 90 or a stored location in second phone number memory 105. Selector 155 is not required when second phone number memory 105 does not exist. In the latter case, second memory device 90 is directly accessible from first telecommunications terminal 1.

The function according to the exemplary embodiment and/or exemplary method of the present invention of network unit 15 in the second exemplary embodiment illustrated in FIG. 2 corresponds to the function according to the exemplary embodiment and/or exemplary method of the present invention previously described in the exemplary embodiment in FIG. 1 of first telecommunications terminal 1. In this case, the function of third detector 95 is the same as the function of first detector 50, except that first detector 50 receives the urgency value directly from telecommunications network 20 whereas third detector 95 must engage extractor 125 to extract the urgency value from the digital sequence transmitted by caller 10. This sequence is made up of the phone number of first telecommunications terminal 1 and the urgency value. The function of third comparator 100 is the same as that of first comparator 55, and the function of second memory device 90 is the same as that of first memory device 45. The function of fourth detector 110 is the same as that of second detector 70. The function of fourth comparator 115 is the same as that of second comparator 75. The function of second phone number memory 105 is the same as that of first phone number memory 65. In this case, the entry of the preset threshold value in second memory device 90 is not performed by directly entering it at first input unit 5. Instead, first input unit 5 must be used to dial network unit 15 and the required threshold value must be entered. This threshold value is then transmitted via a telecommunications connection from first telecommunications terminal 1 to network unit 15 where it is saved in second memory device 90. The same method applies to presetting and saving phone numbers in second phone number memory 105. If network unit 15 is designed with both, second memory device 90 and second phone number memory 105, the information entered at input unit 5 must also include whether the value to be saved is to be stored in second memory device 90, i.e., it is the preset threshold value, or in second phone number memory 105, i.e., it represents a phone number. If a threshold value may only be preset using one or more digits, thereby deviating from the standard number of digits for a phone number, selector 55 is also able to decide based on the number or digits received whether the number represents a threshold value or a phone number, and from there continue to store the value received by first telecommunications terminal 1 appropriately either in second memory device 90 or in second phone number memory 105.

Moreover, the function of second AND gate 135 corresponds to the function of first AND gate 130. The function of second switch 145 corresponds to the function of first switch 140. The function of second call list 30 corresponds to the function of first call list 25. The function of second voicemail recorder 40 corresponds to the function of first voicemail recorder 35. The function of second transmitter 120 corresponds to the function of first transmitter 80. The difference with respect to the first exemplary embodiment as shown in FIG. 1 is that first output 170 of second AND gate 135 is not connected to a signaling device but to call forwarding device 85. When first output 170 of second AND gate 135 is set, in other words when the urgency value received by caller 10 exceeds the preset threshold value stored in second memory device 90 and—with a positive VIP list in second phone number memory 105—the phone number of caller 10 is stored in second phone number memory 105, call forwarding device 85 is initiated and forwards the incoming call from caller 10 to first telecommunications terminal 1, with telecommunications terminal 1 signaling the incoming call in a conventional manner. In cases where network unit 15 does not compare the phone numbers, second input 195 of second AND gate 135 is permanently set. When the detected urgency value is identified as being lower than or equal to the preset threshold value, first output 170 of second AND gate 135 is reset and call forwarding device 85 is not activated which means that the incoming call from caller 10 is not forwarded to first telecommunications terminal 1 so that no signaling takes place. When fourth comparator 115, as illustrated in FIG. 2, compares the phone numbers, first output 170 of second AND gate 135 will also be reset—with a positive VIP list in second phone number memory 105—if the phone number of caller 10 is not stored in second phone number memory 105. In this case also, the forwarding of the incoming call from caller 10 is suppressed by device 85 and there is no signal to first telecommunications terminal 1. When second phone number memory 105 is designed as a negative VIP list, the comments as described for first phone number memory 65 apply accordingly.

The functions of second telecommunications terminal 180 and second input unit 150 as illustrated in FIG. 2 correspond to those described for the first exemplary embodiment in FIG. 1.

The function of first input 190 of second AND gate 135 corresponds to the function of first input 180 of first AND gate 130. The function of second input 195 of second AND gate 135 corresponds to the function of second input 185 of first AND gate 130. The function of first output 170 of second AND gate 135 corresponds to the function of first output 160 of first AND gate 130. The function of second output 175 of second AND gate 135 corresponds to the function of second output 165 of first AND gate 130.

Alternative embodiments to the two previously described may forego the inclusion of a call list 25, 30 and/or a voicemail recorder 35, 40 and/or a transmitter 80, 120.

Figure 3:
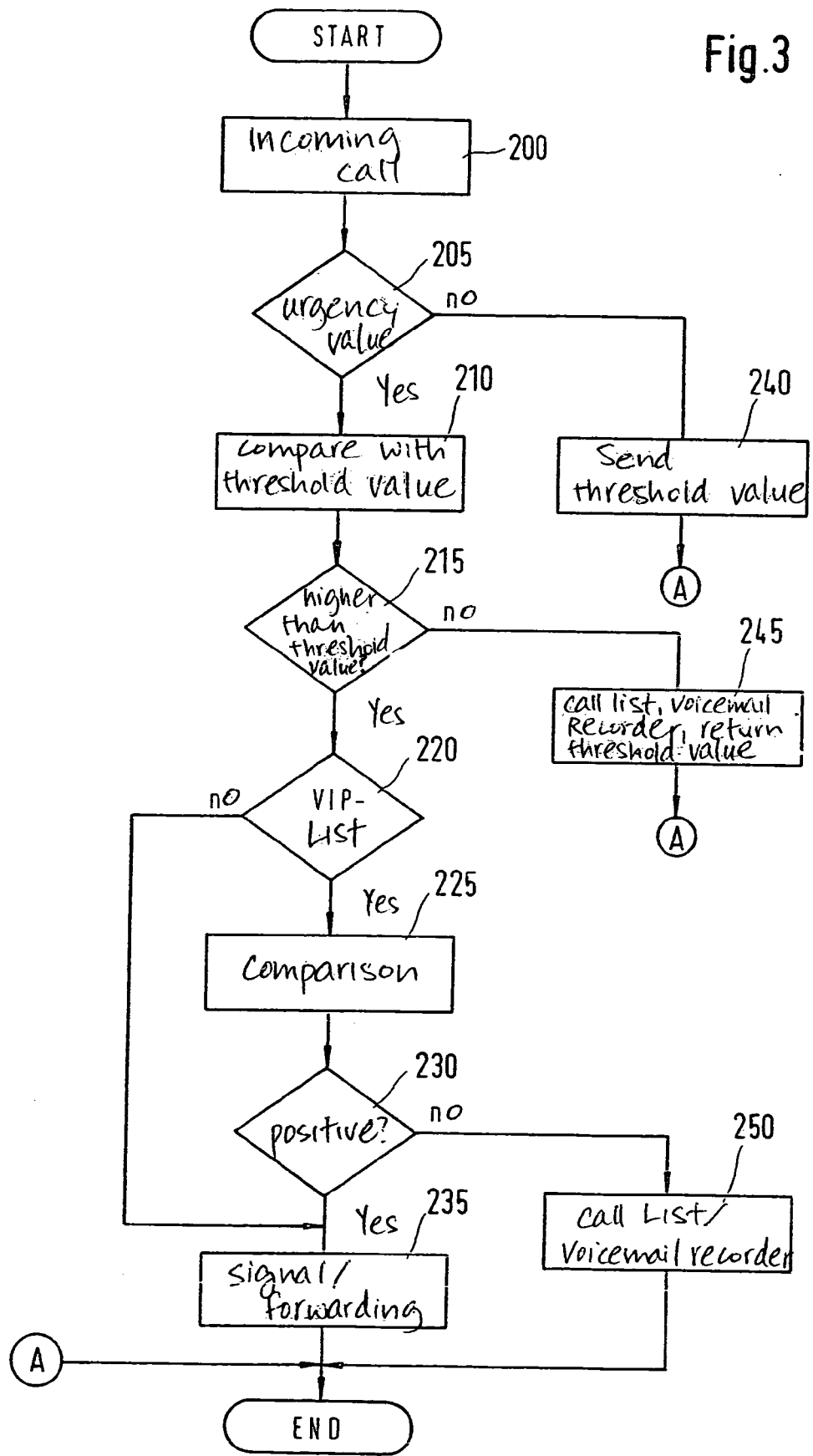
FIG. 3 shows a flow chart of an exemplary method of the present invention.

FIG. 3 shows the sequence of the exemplary method according to the present invention using a flow chart. The sequence applies to the first embodiment in FIG. 1 and the second embodiment in FIG. 2. At a program point 200, first telecommunications terminal 1, or network unit 15, detects an incoming call in first detector 50, or in third detector 95. Subsequently, the sequence branches to a program point 205. At program point 205, first detector 50, or third detector 95, determines whether an urgency value was transmitted along with the incoming call. If this is the case, the sequence branches to a program point 210, otherwise to a program point 240. At program point 210, first comparator 55, or third comparator 100, compares the identified urgency value with the preset threshold value which is stored in first memory device 45, or in second memory device 90. Subsequently, the sequence branches to a program point 215. At program point 215, first comparator 55, or third comparator 100, determines whether the identified urgency value exceeds the preset threshold value. If this is the case, the sequence branches to a program point 220, otherwise to a program point 245. At program point 220, a control system, which checks the sequence of the method, of first telecommunications terminal 1, or of network unit 15, which for greater clarity have not been included in the figures, checks whether first phone number memory 65, or second phone number memory 105, are present. If this is the case, the sequence branches to a program point 225, otherwise to a program point 235. The particular control system is connected to all components of first telecommunications terminal 1, or to all components of network unit 15. At program point 225, second comparator 75, or fourth comparator 115, compares a phone number of caller 10, which is transmitted with the incoming call, with the entries in first phone number memory 65, or second phone number memory 105. Thereafter, the sequence branches to a program point 230. The following description serves to illustrate an example in which first phone number memory 65, or second phone number memory 105, is configured as a positive VIP list. In this case, second comparator 75, or fourth comparator 115, checks at program point 230 whether the phone number received for caller 10 is stored in first phone number memory 65, or in second phone number memory 105. If this is the case, the sequence branches to a program point 235, otherwise to a program point 250. At program point 235, in the first exemplary embodiment illustrated in FIG. 1, first output 160 of first AND gate 130 is set and signaling device 60 is activated to signal the incoming call to first telecommunications terminal 1. In the second exemplary embodiment illustrated in FIG. 2, first output 170 of second AND gate 135 is likewise set to instruct call forwarding device 85 to forward the incoming call of caller 10 to first telecommunications terminal 1. Thereafter, the program is exited. At program point 240, in the first exemplary embodiment as illustrated in FIG. 1, first input 180 of first AND gate 130 is reset and consequently first output 160 of first AND gate 130 is also reset, which results in suppression of the signal for the incoming call at first telecommunications terminal 1. At the same time, second output 165 of first AND gate 130 is set, thereby activating first transmitter 80 via first switch 140 and prompting it to send the preset threshold value to caller 10 via telecommunications network 20.

Accordingly, the second exemplary embodiment illustrated in FIG. 2 shows second transmitter 120 being prompted to transmit the preset threshold value to caller 10 and device 85 being prompted to withhold forwarding of the incoming call of caller 10 to first telecommunications terminal 1. Thereafter, the program is exited.

At program point 245, in the first exemplary embodiment illustrated in FIG. 1, first input 180 of AND gate 130 and consequently first output 160 of first AND gate 130 are reset, which results in suppression of the signal at first telecommunications terminal 1. At the same time, second output 165 of first AND gate 130 is set and first call list 25 and/or first voicemail recorder 35 and/or first transmitter 80 are activated in the manner previously described. Accordingly, in the second exemplary embodiment illustrated in FIG. 2, second call list 30 and/or second voicemail recorder 40 and/or second transmitter 120 are activated, and call forwarding device 85 is instructed not to forward the incoming call of caller 10 to first telecommunications terminal 1. Thereafter, the program is exited.

At program point 250, in the first exemplary embodiment illustrated in FIG. 1, second input 185 of first AND gate 130 and consequently first output 160 of first AND gate 130 are reset, which results in suppression of the signaling of the incoming call at first telecommunications terminal 1. At the same time, second output 165 of first AND gate 130 is set and first call list 25 and/or first voicemail recorder 35 are activated via first switch 140 in the manner previously described. Accordingly, in the second exemplary embodiment illustrated in FIG. 2, second call list 30 and/or second voicemail recorder 40 are activated in the described manner and call forwarding device 85 is instructed not to forward the incoming call of caller 10 to first telecommunications terminal 1. Thereafter, the program is exited.

If the configuration of the first exemplary embodiment as illustrated in FIG. 1 includes first phone number memory 65, second comparator 75 and second detector 70, or second phone number memory 105, fourth comparator 115 and fourth detector 110 for the second exemplary embodiment in FIG. 2, such a configuration enables the user of first telecommunications terminal 1 to deactivate first phone number memory 65, or second phone number memory 105, using input unit 5, such deactivation being effected directly in the first exemplary embodiment illustrated in FIG. 1 and via a telecommunications connection between first telecommunications terminal 1 and network unit 15 in the second exemplary embodiment illustrated in FIG. 2. In the latter case, the first exemplary embodiment illustrated in FIG. 1 is configured with second input 185 of first AND gate 130 being set permanently, and the second exemplary embodiment illustrated in FIG. 2 with second input 195 of second AND gate 135 being set permanently. This enables the user of first telecommunications terminal 1 to use an existing phone number memory for incoming calls for which the signal is not to be suppressed.

Since network unit 15 in the second exemplary embodiment illustrated in FIG. 2 is normally not just assigned to first telecommunications terminal 1 as the called party, the threshold values of multiple telecommunications terminals may be stored in second memory device 90. Accordingly, the VIP lists of multiple telecommunications terminals may be stored in second phone number memory 105. In this configuration, third comparator 100 must use second memory device 90 to identify the threshold value assigned to the dialed telecommunications terminal based on the phone number of this telecommunications terminal transmitted along with the incoming call of caller 10, and compare such number with the urgency value detected in third detector 95. This may be realized by storing the threshold values in correlation to the phone number of the particular telecommunications terminal in second memory device 90. The same applies to the VIP lists which are stored in second phone number memory 105, also correlated to the phone number of the particular telecommunications terminal. Fourth comparator 115 then compares the phone number received together with the incoming call of caller 10 in a corresponding manner with the VIP list entries in second phone number memory 105, which is correlated with the phone number of the telecommunications terminal called by caller 10.

The user of first telecommunications terminal 1 is able to preset the threshold value in first input unit 5 in a range from, for example, zero to nine. If first telecommunications terminal 1 is configured as a cell phone and if the user of first telecommunications terminal 1 is at his place of work, he is able to lower the threshold value to three, for example. If he is in a meeting, he is able to raise the threshold value to seven or eight, for example. In this scenario, he is more accessible at his place of work than in the meeting. In the reverse situation, caller 10 is able to determine the importance of his call. If the purpose of his call is to tell that the pet parakeet has passed away, he may select to input a low urgency value, one, for example, at input unit 5. If he has an urgent message to deliver, he may select a high urgency value, such as nine for example.

Another configuration option is to include in addition or alternatively to the deactivation of first phone number memory 65, or second phone number memory 105, the deactivation of the threshold value in the same manner in first memory device 45, or in second memory device 90, by the user of first telecommunications terminal 1 at input unit 5. In this case, and using the first exemplary embodiment illustrated in FIG. 1, first input 180 of first AND gate 130, or using the second exemplary embodiment illustrated in FIG. 2, first input 190 of second AND gate 135, are set permanently. In the opposite case, the disturbance threshold in first memory device 45, or second memory device 90, and/or first phone number memory 65, or second phone number memory 105, may be reactivated by the appropriate setting at first input unit 5 of first telecommunications terminal 1 to implement the sequence as illustrated in FIG. 3, for example.

In cases where an urgency value is not transmitted with the incoming call, first detector 50, or third detector 95, may interpret this such that the lowest possible urgency value was assigned which is lower than or equal to any programmable preset threshold value.

What is claimed is:

1. A method for signaling an incoming call for a telecommunications terminal, the method comprising:
initiating a signal for the incoming call at the telecommunications terminal only when an urgency value that is transmitted together with the incoming call exceeds a preset threshold value and a phone number of the caller matches a preset phone number, wherein each incoming call is assigned one of a plurality of urgency, wherein the urgency value is appended to a dialed telephone number.

2. The method of claim 1, wherein the preset threshold value is entered at an input unit of the telecommunications terminal.

3. The method of claim 1, wherein the urgency value is entered at a caller's end.

4. The method of claim 1, wherein the urgency value is compared with the threshold value in a network unit of a telecommunications network, and the incoming call for the telecommunications terminal is forwarded by the network unit to the telecommunications terminal only when the urgency value exceeds the threshold value.

5. The method of claim 1, wherein the urgency value is compared with the threshold value in the telecommunications terminal, and a signal for the incoming call is initiated at the telecommunications terminal only when the urgency value exceeds the threshold value.

6. The method of claim 1, further comprising:
transmitting a notification regarding the threshold value to the caller only when the urgency value is lower than or equal to the threshold value.

7. The method of claim 1, further comprising:
transmitting a notification regarding the threshold value to the caller when the caller dials the number of the telecommunications terminal.

8. The method of claim 1, further comprising:
saving the incoming call in a call list if the urgency value is lower than or equal to the threshold value.

9. The method of claim 1, further comprising:
forwarding the incoming call to a voicemail recorder if the urgency value is lower than or equal to the threshold value.

10. A telecommunications terminal comprising:
a signaling device to signal an incoming call;
a first memory device to store a preset threshold value;
one phone number memory including at least one entry;
a first detector to detect an urgency value appended to dialed telephone number and received together with the incoming call;
a second detector to detect a phone number of a caller received together with the incoming call;
a first comparator to compare the urgency value with the preset threshold value; and
a second comparator to compare the detected phone number with the at least one entry in the first phone number memory;
wherein the signaling device signals an incoming call received at the telecommunications terminal only when an urgency value received together with the incoming call exceeds the threshold value and the received and detected phone number of the caller matches an entry in the first phone number memory, wherein each incoming call is assigned one of a plurality of urgency values.

11. The telecommunications terminal of claim 10, further comprising:
a first transmitter to, in response to the incoming call, send a notification regarding the disturbance threshold to the caller.

12. The telecommunications terminal of claim 11, wherein the first transmitter sends the notification regarding the disturbance threshold to the caller only when the urgency value is lower than or equal to the disturbance threshold.

13. The telecommunications terminal of claim 10, wherein a first call list stores an incoming call when the urgency value is lower than or equal to the disturbance threshold.

14. The telecommunications terminal of claim 10, further comprising:
a first voicemail recorder to receive an incoming call when the urgency value is lower than or equal to the disturbance threshold.

15. The telecommunications terminal of claim 10, further comprising:
an input unit to preset at least one of the threshold value and the urgency value.

16. A network unit of a telecommunications network, the network unit comprising:
a device to forward an incoming call to a dialed telecommunications terminal;
a second memory device to store a preset threshold value appended to a dialed telephone number and;
a second phone number memory having at least one entry;
a third detector to detect an urgency value received with the incoming call;
a third comparator to compare a detected urgency value with the preset threshold value;
a fourth detector to detect a phone number of a caller received together with the incoming call;
a fourth comparator to compare the detected phone number with the at least one entry in the second phone number memory; and
a call forwarding device to forward the incoming call to a dialed telecommunications terminal only when the urgency value exceeds the threshold value and the received and detected phone number of the caller matches an entry in the second phone number memory, wherein each incoming call is assigned one of a plurality of urgency values.

17. The network unit of claim 16, further comprising:
a second transmitter to, in response to the incoming call, send a notification regarding the disturbance threshold to the caller.

18. The network unit of claim 17, wherein the second transmitter sends the notification regarding the disturbance threshold to the caller only when the urgency value is lower than or equal to the disturbance threshold.

19. The network unit of claim 16, further comprising:
a second call list to store an incoming call when the urgency value is lower than or equal to the disturbance threshold.

20. The network unit of claim 16, further comprising:
a second voicemail recorder to receive an incoming call when the urgency value is lower than or equal to the disturbance threshold.

21. The network unit of claim 16, further comprising:
an extractor to extract a phone number of the telecommunications terminal and the urgency value from a digital sequence received from the caller.

* * * * *